United States Patent [19]

Hill et al.

[11] 3,713,714
[45] Jan. 30, 1973

[54] METHODS OF MANUFACTURING FLANGED BEARINGS

[75] Inventors: Joseph Henry Hill, Greenford; Geoffrey Philip Keeling; Roger Hugh Spikes, Marlow, all of England

[73] Assignee: Vandervell Products Limited, Berkshire, England

[22] Filed: Aug. 9, 1971

[21] Appl. No.: 170,255

[30] Foreign Application Priority Data

Sept. 25, 1970 Great Britain.....................45,904/70

[52] U.S. Cl..................................................308/237
[51] Int. Cl.............................................F16c 33/14
[58] Field of Search.......308/237, 23, 23.5, 161, 165, 308/167, 36; 29/513

[56] References Cited

UNITED STATES PATENTS

| | | | |
|---|---|---|---|
| 2,124,060 | 7/1938 | Gilman | 308/237 |
| 3,251,119 | 5/1966 | Kingsbury et al. | 308/237 |
| 3,361,502 | 1/1968 | Weinkamer et al. | 308/237 |
| 3,375,563 | 4/1968 | Kingsbury et al. | 308/237 |

FOREIGN PATENTS OR APPLICATIONS 1,012,142  12/1965  Great Britain.......................308/237

*Primary Examiner*—Charles J. Myhre
*Assistant Examiner*—Barry Grossman
*Attorney*—Raymond J. Mawhinney et al.

[57] ABSTRACT

A flanged bearing has a thin wall flexible bearing liner and end flanges formed as separate components. The flanges are attached to the liners by radial lugs on the inner peripheries of the flanges which engage in slots in the axial ends of the liner so that the curvature of the liner can vary with respect to the flanges. Outwardly projecting stakes are formed in the end edges of the liner to prevent the flanges disengaging axially from the liner while permitting limited axial float of the flanges with respect to the liner.

13 Claims, 6 Drawing Figures

PATENTED JAN 30 1973

INVENTOR
JOSEPH HENRY HILL ETAL
BY John A. Mawhinney
ATTY

METHODS OF MANUFACTURING FLANGED BEARINGS

This invention relates to flanged half bearings and also to methods of manufacturing flanged half bearings.

The invention provides a flanged half bearing comprising a thin wall flexible half bearing liner and a flange extending radially outwardly of at least one axial end of the liner characterized in that the flange is attached to the liner by means which allow the circumferential shape of the liner to vary relative to the flange.

Thus when the flanged bearing is located in a housing the liner can bend to conform to the shape of the housing without restriction by the flange, and also the liner can vary in shape with variation in shape of the housing due to load on the housing when in use without restriction by the flange.

Preferably the attachment means also permit relative movement of the flange with respect to the liner in a direction parallel to the axis of the liner. Thus the flange can move with respect to the liner to seat on the housing in which the bearing is located.

It is also preferred that one of the said flanges is provided at both axial ends of the liner.

In any of the arrangements referred to above the flange may encircle said axial end of the liner and the attachment means may comprise a plurality of lugs spaced apart around the inner periphery of the flange and a plurality of corresponding slots in the end of the liner in which the lugs engage.

Three lugs may be provided at spaced locations which engage in three corresponding slots in the end of the liner.

In either of the latter arrangements radially outwardly projecting abutment means may be provided at the end of the liner to prevent the flange from disengaging axially from the liner whilst permitting axial movement of the flange with respect to the liner.

The abutment means may comprise a number of separate abutments located at the edge of the liner on either side of each slot.

Alternatively the abutment means comprises a lip around said end of the liner between the slots.

In any of the arrangements in which the flange has lugs which engage in slots in the liner the inner periphery of the end portion of the liner may be chamfered and the sides of the lugs which face axially away from the liner are also chamfered.

The liner and flange may each comprise a backing and a layer or layers of bearing material.

The flange and liner may have backings of different thickness.

The layers of bearing material on the liner and the flange may be of different thickness.

The flange and liner may have coatings of different bearing materials.

The invention also provides a method of manufacturing flanged half bearings having a thin wall flexible half bearing liner and a flange extending radially outwardly of at least one axial end of the liner comprising forming the liner and flange as separate components, forming the liner and flange with attachment means for retaining the flange on the liner which allow the circumferential shape of the liner to vary relative to the flange, and attaching the flange to the liner by said means.

Inwardly projecting lugs may be formed around the inner periphery of the flange and corresponding radial slots may be formed in the end of the liner to provide the attachment means.

Abutment means may be provided around the end of the liner which project radially outwardly to prevent axial disengagement of the flange from the liner whilst permitting limited axial movement of the flange with respect to the liner.

The edge of the liner on either side of each slot may be deformed outwardly to form abutments for limiting axial movement of the flange with respect to the liner.

Alternatively the edge of the liner may be deformed outwardly between the slots by rolling or pressing to provide abutments to limit axial movement of the flange with respect to the liner.

A chamfer may be formed around the inner peripheral edge of the liner.

Preferably separate flanges are attached to both ends of the liner.

The following is a description of some specific embodiments of the invention reference being made to the accompanying drawings in which.

Figure 1:
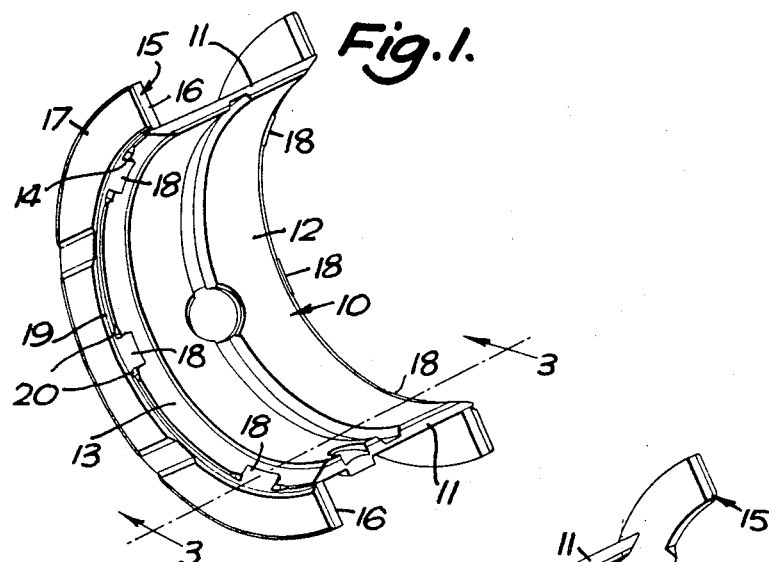
FIG. 1 is a perspective view of a flanged half bearing formed from a separate liner and flanges.
Figure 2:
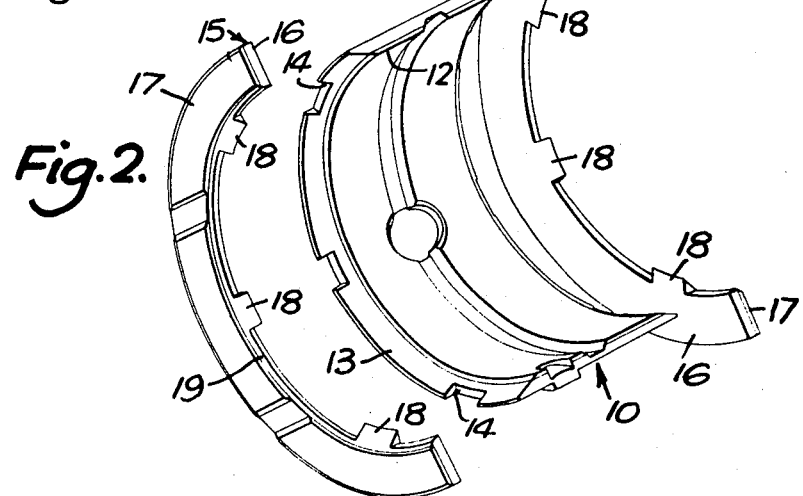
FIG. 2 is a perspective view of the bearing shown in FIG. 1 with the flanges separated from the bearing.
Figure 3:
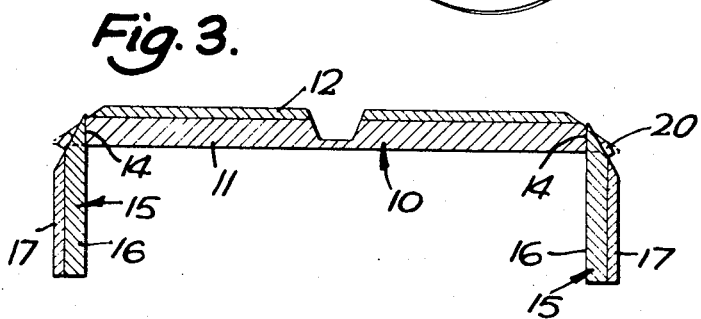
FIG. 3 is a section on the line 3—3 of FIG. 1.

Referring firstly to FIGS. 1 to 3 of the drawings, there is shown a flanged bearing comprising a thin wall flexible half bearing liner 10 which has a steel back 11 and a coating 12 of bearing material such as lead bronze with or without an overlay of lead indium around its inner surface. The axial end faces 13 of the liner are chamfered so that the liner tapers towards the inner surface thereof. At each axial end of the liner three spaced radial rectangular slots 14 are formed which open into the chamfered face 13. One slot 14 is formed at the center of the axial end of the liner and the other two slots are spaced equally on either side of the central slot towards the circumferential ends of the liner.

Radially outwardly extending flanges 15 encircle the outer face of the liner 10 at each axial end thereof. Each flange comprises a steel backing layer 16 and the thrust faces of the flanges have coatings of bearing material such as an aluminum tin alloy containing 80 percent aluminum and 20 percent tin.

Each flange is formed around its inner periphery with three inwardly projecting lugs 18 which are rectangular in contour and engage in the slots 14 of the circumferential end of the liner to locate the flange on the liner.

The inner periphery of the flange is chamfered as indicated at 19 on the side to which the bearing material 17 is applied and the lugs 18 are similarly chamfered so that they each taper to a point. The length of the lugs 18 is at least equal to the length of the slots 14 in the end of the liner and the inner ends of the lugs 18 may project slightly from the slots 14.

The outer circumferential edge at each end of the liner is indented on either side of each slot 14 to form radially outwardly projecting stakes 20 which overlie the chamfered edge 19 of the flange and prevent the flange from being separated from the liner in an axial direction. The stakes are formed so that the flanges are permitted limited axial movement with respect to the liner.

In use a pair of the flanged bearings are mounted in a housing with the circumferential ends of one bearing abutting the circumferential ends of the other bearing and a crankshaft is supported in the bearings with a journal of the crankshaft engaging the liners and cheeks of the crankshaft engaging the thrust faces of the flanges.

The connection of the flanges to the liner by the aforesaid lugs and slots permits the liner to vary to a certain extent in circumferential shape without restriction by the flanges. The liner is manufactured so that the distance between the circumferential ends is greater than that of the diameter of the housing in which the flanged bearing is to be mounted. When the flanged bearing is pressed into the housing the circumferential ends of the liner are sprung towards one another but the lug and slot connections between the flanges and the liner allow this change in shape without distorting the flanges.

Distortion of the flanges can be detrimental because if the flanges of a bearing are inclined inwardly towards one another when the bearing is inserted in the housing the flanges will only engage the cheeks of the crankshaft around their inner edges and this will prevent outward flow of lubricating oil between the thrust faces and crankshaft cheeks. As a result the flanges will wear rapidly at their inner edges.

If, alternatively the flanges were turned outwardly away from one another when the bearing is inserted in the housing they would only engage the crankshaft cheeks around their outer edges resulting in high wear at the outer edges.

The limited axial movement permitted between the flanges and liner of the bearing enables the flanges to move with respect to the liner when the liner is located in a housing to seat against the housing thus catering for slight manufacturing tolerances in the lengths of the housings.

Figure 4:
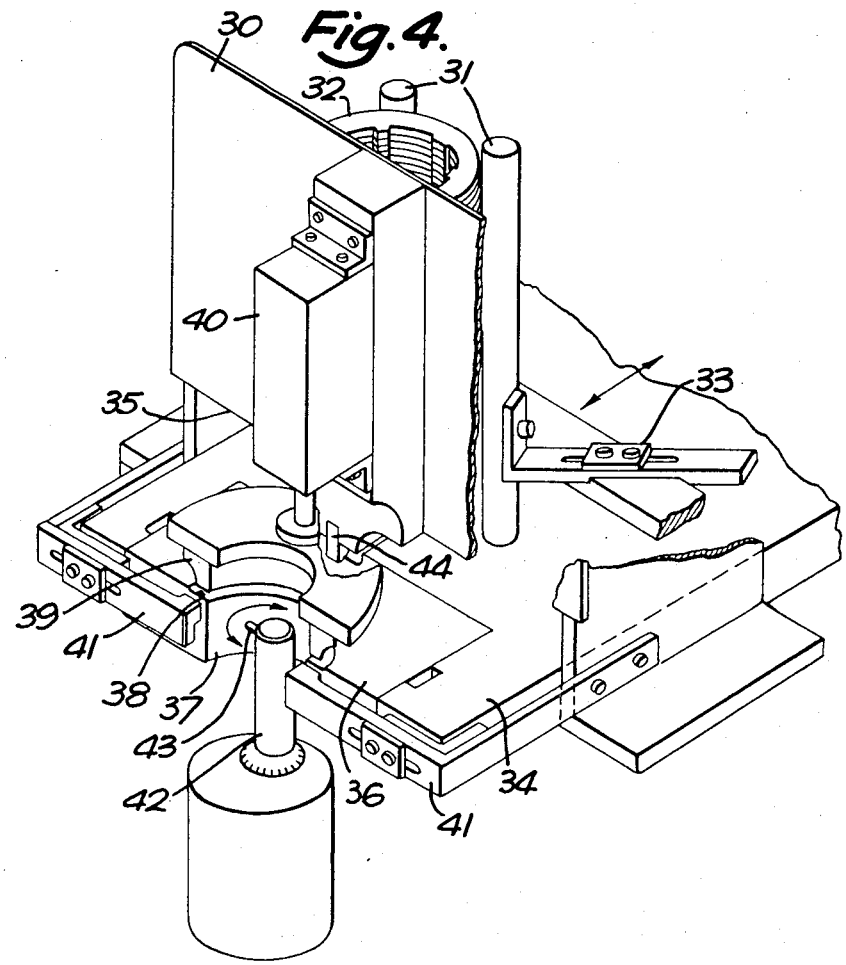
FIG. 4 is a perspective view of a machine for forming chamfers on the flanges of the bearing prior to assembly of the bearing.

The flanges and bearing liner of the flanged bearing described above are manufactured as separate components. The flanges 15 are blanked from strip bearing material in conventional manner, the only difference being that the flanges are formed with the inwardly projecting lugs 18. The flanges are then passed to the apparatus illustrated in FIG. 4 of the drawings which forms the chamfer 18 around the inner periphery of each flange. The apparatus comprises a fixed vertical plate 30 on one side of which there is a magazine formed by vertical guide rods 31 which hold a stack 32 of flanges with the sides of the flanges coated with bearing material 17 uppermost. The rods 31 of the magazine are adjustably mounted as indicated at 33 to cater for different sizes of flanges. The horizontal table 34 is spaced below the lower edge 35 of the plate 30 by the thickness of one flange and is reciprocable in a direction transverse to the plane of the plate 30. At one end of the table 34 there is an inset flange nest 36 which has a semicircular recess 37 in one end corresponding in radius to the inner radius of the flanges. An arcuate recess 38 is formed in the upper surface of the nest 36 around the recess 37 to receive one flange. Different flange nests are provided for different sizes of flanges. The flange can be clamped in the recess by a clamping member 39 mounted on a vertically reciprocating pneumatic ram 40 which is mounted on the opposite side of the plate 30 the magazine. The circumferential ends of the flange abut stops 41 which are mounted on the edge of the table and are adjustable to cater for flanges of different sizes.

The table reciprocates horizontally in a direction transverse to the plane of the plate 30 between a forward cutting position as illustrated and a rearward position in which the arcuate recess 38 is located between the magazine of flanges to receive a flange. In the forward position of the table a flange 15 is clamped in the recess by the ram 40 and a tool 42 which rotates at high speed about a vertical axis and has a horizontally projecting cutter tool 43 is traversed in a semicircular path over the upper inner peripheral edge of the flange to form the chamfer 19 around the upper inner edge of the flange and on the lugs 18. When the cutter has completed the cutting operation the ram 40 is retracted releasing the clamping member 39 and the table is withdrawn to the rearward position. A downwardly loaded spring pawl 44 mounted adjacent the lower end of the table displaces the flange from the arcuate recess 38 as the table moves rearwardly so that the recess can then receive the next flange.

Figure 5:
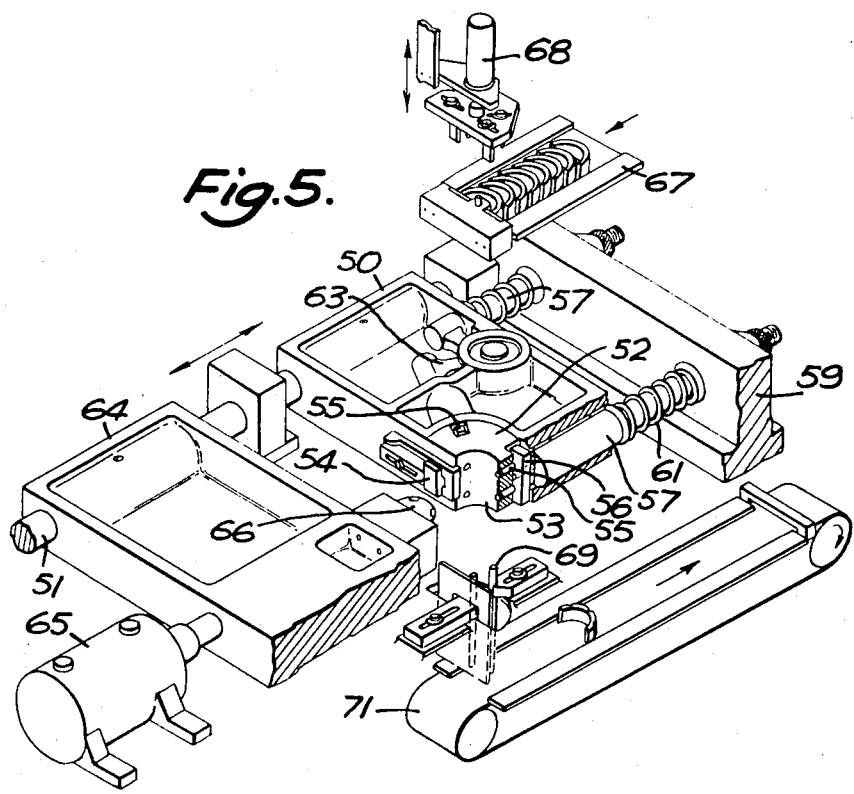
FIG. 5 is a perspective view of a machine for forming slots in the circumferential edges of the bearing liner of the flanged bearing before the bearing is assembled.

The bearing liners 10 are manufactured in a conventional manner. The end faces of the liners are then chamfered to form the chamfered faces 13 as described above and the liners are then passed to the machine illustrated in FIG. 5 of the drawings in which the slots 14 are punched in the axial ends of the liners. The machine, the right hand part of which has been cut away in the drawing, comprises a carrier 50 which is mounted for horizontal movement on fixed pillars 51. A punch holder 52 is mounted on the carrier having a semicircular recess 53 for receiving a liner and spring loaded pressure arms 54 engage the circumferential ends of the liner to hold the liner in position in the recess 53. Pairs of punches 55 are slidable in bores in the punch holder 52 at locations spaced around the die corresponding to the spacing of the required slots 14 in the liner. Each pair of punches is mounted on a holder 56 located in a recess in the outer periphery of the die. The holder 56 is fixed against movement by a rod 57 which connects the holder to a fixed cross-member 59. A coil spring 61 encircling the rod 57 acts between the carrier 50 and the cross members 59 to urge the carrier away from the cross-member. The blocks 55 for the two other pairs of punches are connected through bell crank levers 63 pivoted on the carrier to similar rods 57 encircled by further springs 61.

A breach block 64 is slidably mounted on the pillars 51 and is driven in either direction by a pneumatic ram 65. A semi-circular die 66 is mounted on a side of the breach block adjacent the carrier 50.

The breach block 64 is traversed towards the carrier 50 by the ram 65 which pressed the die 66 into engagement with a bearing liner located in the recess 53 and further movement of the breach block forces the carrier 50 towards the cross-member 59 against the action of the springs 61. The punches 55 held stationary by the rods 57 project from the bores in the punch holder 52 and are driven by the movement of the liner with the die 66, and punch holder 52 through the circumferential edges of the liner. At the end of the punching movement the ram 65 is retracted and the carrier 50 is returned to its initial position under the action of the springs 61 thus withdrawing the punches into the bores in the punch holder 52.

Liners are fed to the recess 53 from a magazine 67 located over the recess and are driven into the recess by a ram 68. The action of driving a liner into the recess displaces the liner punched in the previous operation from the recess downwardly where it is guided by guides 69 onto a conveyor 70.

The rods 57 are adjustably mounted in the cross-member to vary the initial position of the carrier and thereby vary the movement of the punches 55 with respect to the punch holder 52 for a given stroke of the ram 65.

Figure 6:
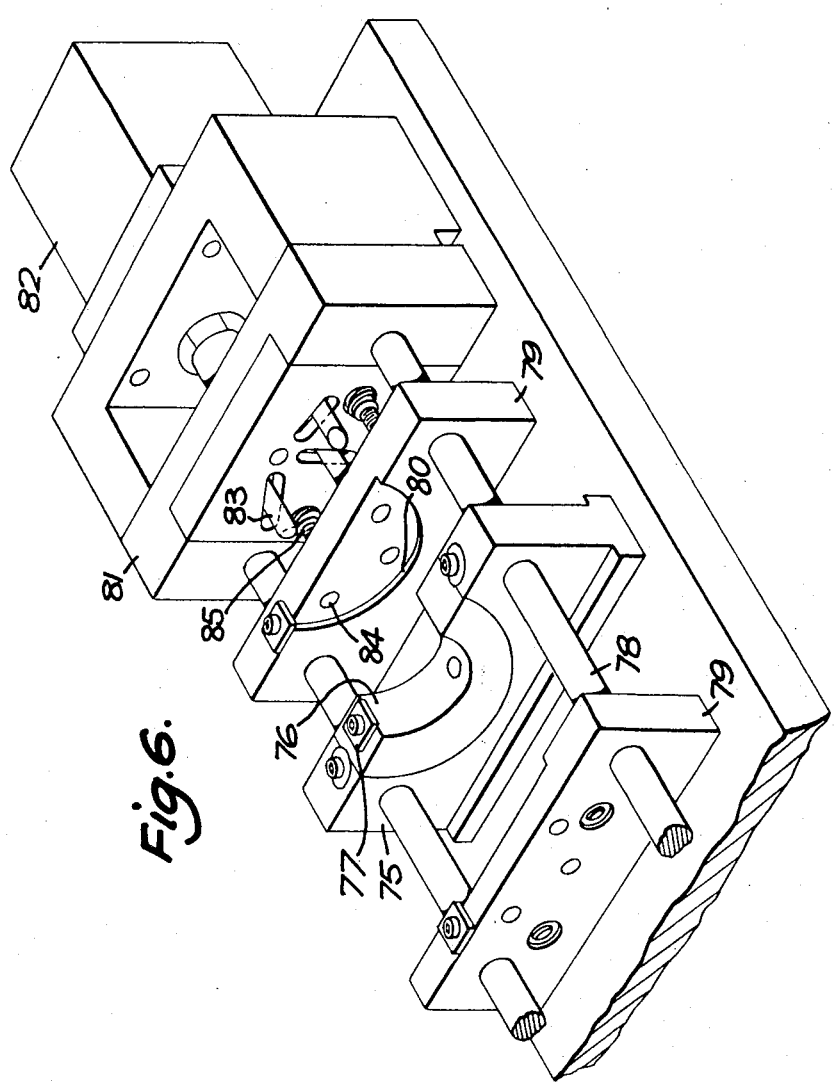
FIG. 6 is a perspective view of an apparatus for assembling the flanges and bearing liners.

The punched liner and chamfered flanges are then assembled in the assembly fixture shown in FIG. 6 of the drawings to which reference is now made. The fixture, part of which is omitted from the drawing, comprises a central block 75 having an upwardly facing arcuate recess 76 for receiving a liner 10 and an abutment 77 is provided at one circumferential end of the recess 76 to hold the liner in situ. The member 75 is located on two horizontally extending pillars 78 and two further members 79 are slidably mounted on pillars 78 on either side of the member 75. Each member 79 is formed on the side adjacent the member 75 with a semi-circular recess 80 to receive a flange 15 and on abutment 80a is provided for engaging one circumferential end of the flanges to ensure correct alignment with the liner. Located on the opposite side of each member 79 is a punch carrier 81 (only one is illustrated) which is also guided on the pillars 78 and is driven towards and away from the member 75 by a pneumatic ram 82. The punch carrier has three adjustably mounted punches 83 and each member 79 is provided with three apertures 84 through which the punches 83 can pass to engage the circumferential edges of the liner on either side of each slot 14 to indent the edges thereby forming the stakes 20 in the outer circumferential edges of the liner to retain the flanges on the liner. Each punch carrier 81 and its adjacent member 79 are spaced by spring loaded plungers 85.

Initial movement of each carrier 81 towards the member 75 under the action of the rams 82 locates the flange 15 carried by the member 79 around the axial end of the liner located in the member 75 with the lugs 18 of the flange engaged in the slots 14 in the liner. The member 79 remains stationary during further movement of the carrier 81 and the punches 83 pass through the apertures 84 in the member 79 and indent the circumferential edges of the liner as described above. The rams then retract the carriers 81 and members 79 and an ejector pin 83 located in the surface of the recess 76 in the member 75 is raised to release the assembled flange half bearing from the member 75.

It will be appreciated that many modifications may be made to the above-described flanged half bearings without departing from the scope of the invention. For example the thickness of the backing layers of the flanges and liner of the bearings may differ and the thickness and bearing material of the flanges and liner may also differ.

Also the coating of bearing marerial on either the flanges or the liner may comprise a plurality of layers of differing materials.

Instead of providing abutments 20 for holding the flanges against axial disengagement from the liner, the whole peripheral edge of the liner may be rolled to form an outwardly projecting lip to retain the flange on the liner. Also the slots 14 in the liners may be formed by milling or cutting instead of punching.

We claim:

1. A flanged half bearing comprising a thin wall flexible half bearing liner and a flange extending radially outwardly of at least one axial end of the liner wherein the improvement comprises attaching the flange to the liner by means which allow the circumferential shape of the liner to vary relative to the flange.

2. A flanged half bearing as claimed in claim 1 wherein the attachment means permit relative movement of the flange with respect to the liner in a direction parallel to the axis of the liner.

3. A flanged half bearing as claimed in claim 1 wherein one of the said flanges is provided at both axial ends of the liner.

4. A flanged half bearing as claimed in claim 1 wherein the flange encircles said axial end of the liner and the attachment means comprise a plurality of lugs spaced apart around the inner periphery of the flange and a plurality of corresponding slots in the end of the liner in which the lugs engage.

5. A flanged half bearing as claimed in claim 4 wherein three lugs are provided at spaced locations which engage in three corresponding slots in the end of the liner.

6. A flanged half bearing as claimed in claim 4 wherein radially outwardly projecting abutment means are provided at the end of the liner to prevent the flange from disengaging axially from the liner whilst permitting limited axial movement of the flange with respect to the liner.

7. A flanged half bearing as claimed in claim 6 wherein the abutment means comprise a number of separate abutments located at the edge of the liner on either side of each slot.

8. A flanged half bearing as claimed in claim 6 wherein the abutment means comprises a lip around said end of the liner between the slots.

9. A flanged half bearing as claimed in claim 4 wherein the inner periphery of the end portion of the liner is chamfered and the sides of the lugs which face axially away from the liner are also chamfered.

10. A flanged half bearing as claimed in claim 1 wherein the liner and flange each comprise a backing and a layer or layers of bearing material.

11. A flanged half bearing as claimed in claim 10 wherein the flange and liner have backings of different thickness.

12. A flanged half bearing as claimed in claim 10 wherein the layers of bearing material on the liner and the flange are of different thickness.

13. A flanged half bearing as claimed in claim 10 wherein the flange and liner have coatings of different bearing materials.

* * * * *